United States Patent
Herman et al.

(10) Patent No.: US 12,397,779 B2
(45) Date of Patent: Aug. 26, 2025

(54) DETECTION OF VEHICLE OPERATING CONDITIONS

(71) Applicant: Ford Global Technologies, LLC, Dearborn, MI (US)

(72) Inventors: David Michael Herman, Oak Park, MI (US); Aaron Lesky, Ypsilanti, MI (US); Ronald Beras, Warren, MI (US); Ashwin Arunmozhi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 586 days.

(21) Appl. No.: 16/752,820

(22) Filed: Jan. 27, 2020

(65) Prior Publication Data

US 2021/0229657 A1    Jul. 29, 2021

(51) Int. Cl.
*G07C 5/08*    (2006.01)
*B60W 30/09*    (2012.01)
*B60W 30/095*    (2012.01)
*G06N 3/08*    (2023.01)

(52) U.S. Cl.
CPC ........ *B60W 30/09* (2013.01); *B60W 30/0956* (2013.01); *G06N 3/08* (2013.01); *G07C 5/0816* (2013.01); *B60W 2530/201* (2020.02); *B60W 2554/404* (2020.02); *B60W 2554/804* (2020.02)

(58) Field of Classification Search
CPC ............ B60W 30/09; B60W 30/0956; B60W 2530/201; B60W 2554/404; B60W 2554/804; G06N 3/08; G06N 3/0445; G06N 3/0454; G07C 5/0816
See application file for complete search history.

(56) References Cited

U.S. PATENT DOCUMENTS

| | | | |
|---|---|---|---|
| 6,094,160 A | 7/2000 | Lajiness | |
| 8,731,742 B2 | 5/2014 | Zagorski et al. | |
| 9,731,713 B2 | 8/2017 | Horii | |
| 11,143,753 B2 * | 10/2021 | Longman | G01S 13/34 |
| 2019/0077394 A1 * | 3/2019 | Ehmann | B60W 50/14 |
| 2020/0114926 A1 * | 4/2020 | Liu | G06N 20/00 |
| 2020/0294401 A1 * | 9/2020 | Kerecsen | G05D 1/0287 |
| 2022/0205809 A1 * | 6/2022 | Mayster | G01C 21/3807 |

FOREIGN PATENT DOCUMENTS

| | | | |
|---|---|---|---|
| CN | 110316056 A | * | 10/2019 |
| WO | 2019076464 A1 | | 4/2019 |

* cited by examiner

*Primary Examiner* — Peter D Nolan
*Assistant Examiner* — Chanmin Park
(74) *Attorney, Agent, or Firm* — Frank A. MacKenzie; Brooks Kushman P.C.

(57) ABSTRACT

A system includes a processor programmed to: identify, based on data from first sensors included in a first vehicle, a second vehicle moving within a first threshold distance of a travel path of the first vehicle and within a second threshold distance of the first vehicle. The processor is further programmed to receive, from second sensors included in the first vehicle, transient velocity data of the second vehicle; and determine an operating condition of the second vehicle based on the transient velocity data.

20 Claims, 9 Drawing Sheets

DETECTION OF VEHICLE OPERATING CONDITIONS

BACKGROUND

A vehicle trajectory may change abruptly due to a change in an operating condition such as loss of traction, hitting a pothole, a component failure, etc. Some time may elapse between the change of the operating condition and a detectable change in trajectory.

DETAILED DESCRIPTION

Introduction

Figure 1:
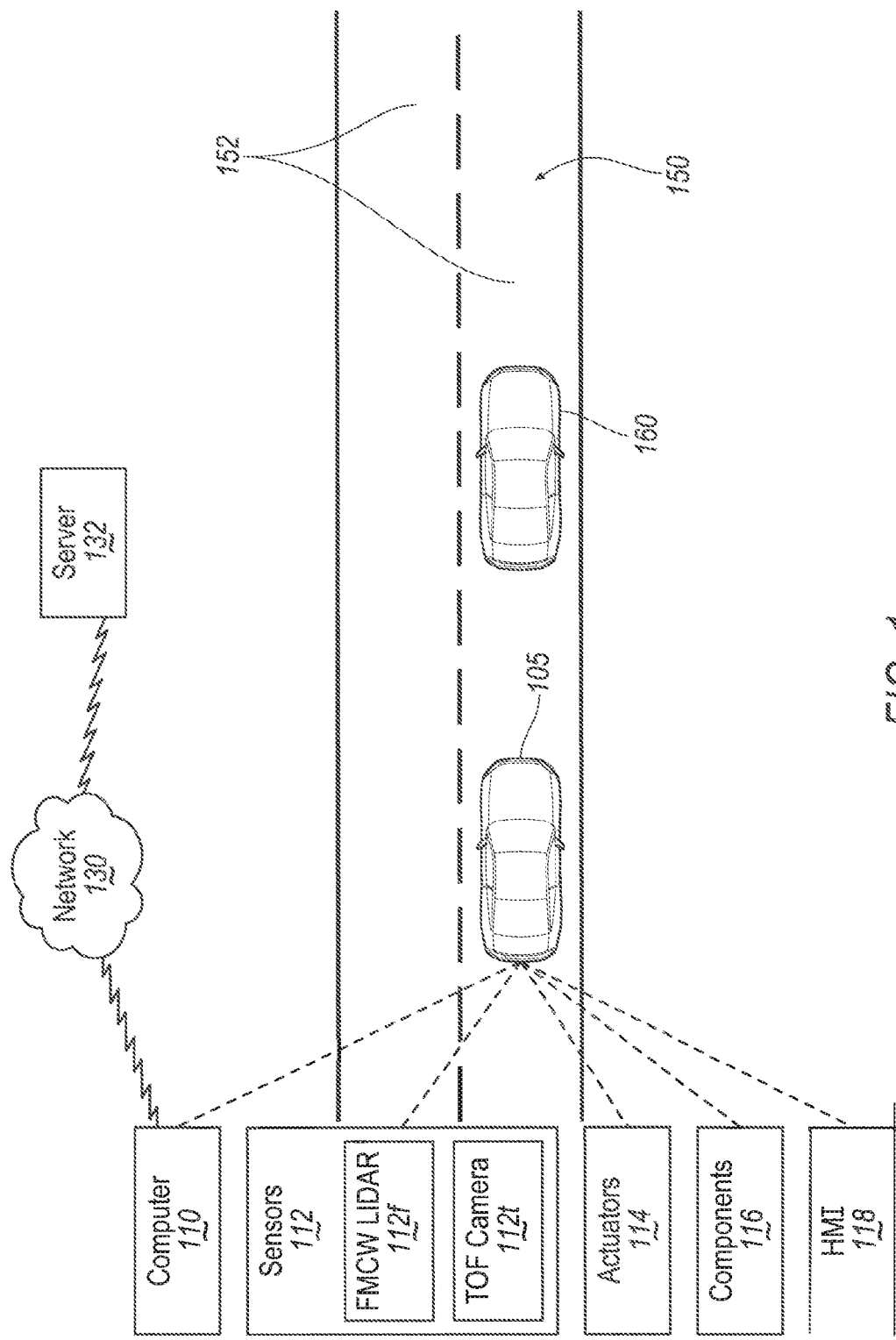
FIG. 1 is a diagram of an example system for monitoring and responding to operating conditions of object vehicles.

Disclosed herein is a system comprising a computer including a processor and a memory, the memory including instructions such that the processor is programmed to: identify, based on data from first sensors included in a first vehicle, a second vehicle moving within a first threshold distance of a travel path of the first vehicle and within a second threshold distance of the first vehicle; receive, from second sensors included in the first vehicle, transient velocity data of the second vehicle; and determine an operating condition of the second vehicle based on the transient velocity data.

In the system, the processor can further be programmed to: determine, based on the data from the first sensors, an average radial velocity of the second vehicle relative to the first vehicle, wherein determining the operating condition of the second vehicle is further based on the average radial velocity of the second vehicle relative to the first vehicle.

In the system, the processor can further be programmed to: determine, based on data from the first sensors; physical measurements of the second vehicle, wherein determining the operating condition of the second vehicle is further based on the physical measurements of the second vehicle.

In the system, the processor can further be programmed to: determine a velocity of the second vehicle relative to a support surface, wherein determining the operating condition of the second vehicle is further based on the velocity of the second vehicle relative to the support surface.

In the system, the processor can further be programmed to: determine a type of support surface on which the second vehicle is travelling, wherein determining the operating condition of the second vehicle is further based on the type of the support surface.

In the system, the processor can further be programmed to: predict a trajectory of the second vehicle based on the determined operating condition of the second vehicle.

In the system, the processor can further be programmed to: adjust a travel path of the first vehicle based on the predicted trajectory of the second vehicle.

In the system, the processor can further be programmed to: receive from the second sensors, transient velocity data from a surface supporting the first vehicle; and determine the operating condition in part based on the transient velocity data from the surface supporting the first vehicle.

In the system, the processor can further be programmed to: select a measurement target on the second vehicle; and direct the second sensors to collect the transient velocity data from the measurement target.

In the system, the processor can further be programmed to: input the transient velocity data from the second vehicle to a trained neural network which determines the operating condition; and receive the operating condition of the second vehicle from the trained neural network.

In the system, the trained neural network can be trained using a plurality of transient velocity data, each of the plurality of transient velocity data representative of a moving vehicle in a respective controlled operating condition and further wherein each of the respective controlled operating conditions correspond to respective ground truths for purposes of training the trained neural network.

In the system, the processor can further be programmed to: notify the second vehicle in case that the transient velocity data indicates a failure mode in the second vehicle.

Further disclosed is a method comprising: identifying, based on data from first sensors included in a first vehicle, a second vehicle moving within a first threshold distance of a travel path of the first vehicle and within a second threshold distance of the first vehicle; receiving, from second sensors included in the first vehicle, transient velocity data of the second vehicle; and determining an operating condition of the second vehicle based on the transient velocity data.

The method can further comprise: determining, based on the data from the first sensors, an average radial velocity of the second vehicle relative to the first vehicle, wherein determining the operating condition of the second vehicle is further based on the average radial velocity of the second vehicle relative to the first vehicle.

The method can further comprise: determining, based on data from the first sensors; physical measurements of the second vehicle, wherein determining the operating condition of the second vehicle is further based on the physical measurements of the second vehicle.

The method can further comprise: determining a velocity of the second vehicle relative to a support surface, wherein determining the operating condition of the second vehicle is further based on the velocity of the second vehicle relative to the support surface.

The method can further comprise: predicting a trajectory of the second vehicle based on the determined operating condition of the second vehicle, and adjusting a travel path of the first vehicle based on the predicted trajectory of the second vehicle.

The method can further comprise: receiving from the second sensors, transient velocity data from a surface supporting the first vehicle; and determining the operating condition in part based on the transient velocity data from the surface supporting the first vehicle.

The method can further comprise: inputting the transient velocity data from the second vehicle to a trained neural network which determines the operating condition; and receiving the operating condition of the second vehicle from the trained neural network, wherein the trained neural network is trained using a plurality of transient velocity data, each of the plurality of transient velocity data representative of a moving vehicle in a respective controlled operating condition and further wherein each of the respective controlled operating conditions correspond to respective ground truths for purposes of training the trained neural network.

The method can further comprise: notifying the second vehicle in case that the transient velocity data indicates a failure mode in the second vehicle.

Further disclosed herein is a computing device programmed to execute any of the above method steps.

Yet further disclosed herein is a computer program product, including a computer readable medium storing instructions executable by a computer processor, to execute any of the above method steps.

EXEMPLARY SYSTEM ELEMENTS

A computer in a host vehicle can obtain transient velocity data, i.e., data about vehicle and/or vehicle component transient velocities for vehicles operating in an environment of the host vehicle. The transient velocity data can be used to identify one or more vehicle operating conditions that can affect a vehicle's trajectory. The future trajectory of one or more vehicles may be predicted in part based on the detected operating conditions. Based on identifying the operating conditions, a host vehicle trajectory can be modified. It is a problem that operating conditions can affect a vehicle's trajectory, but may not be identified, or at least may not be timely identified. As disclosed herein, host vehicle sensor data can be used to determine operating conditions of other vehicles based on transient velocity data and predict trajectory changes of other vehicles before the trajectory changes are detectable by sensor-based systems that do not consider transient velocity data. In some cases, the determined operating condition based on transient velocity data can provide better, i.e., more timely and/or more precise, data concerning future vehicle trajectory than a detected change in trajectory. For example, in the case of detecting a failed component, or a driver disorder such as distraction or road rage, the computer may not be able to interpret an initial change of trajectory as indicative of additional, potentially erratic future changes in the vehicle trajectory, whereas determinations of transient velocity as disclosed herein can lead to such determination by a vehicle computer. Further, host vehicle operation can be smoother, i.e., the present disclosure provides for less abrupt and more efficient adjustments to changes to operating conditions of other vehicles.

The host vehicle computer can collect sensor data from sensors on the host vehicle regarding an environment around the host vehicle, including identifying an object vehicle operating in or along a planned route of the host vehicle. The computer can determine, based on the collected vehicle sensor data, (a) that the object vehicle is moving, (b) a velocity of the object vehicle, (c) a radial velocity of the object vehicle relative to the host vehicle, and (d) a model and/or type of object vehicle. Additionally, the computer can collect transient velocity data from the object vehicle. Transient velocity is a metric for characterizing relative movements of the vehicle or elements on the vehicle at the specific time of data collection compared to a reference coordinate system, such as the sensor position on the host vehicle. Transient velocity may be detected frequently by a sensor. Radial velocity is the relative movement that occurs along the ray from the sensor to the position in space of the detection of transient velocity. This radial velocity may be a component of the velocity vector of the other vehicle or object. The velocity vector of the other vehicle may be estimated through incorporation of multiple transient radial velocity measurements in quick succession. Sensors measure these small oscillations or pulse-like movements and output transient velocity data, which indicate a velocity of a measurement target on the vehicle at the frequency of the oscillation or the pulse-like movement, for example in units of meters per second. Transient velocity data may be used to define a transient velocity profile, i.e., a respective transient velocity of the vehicle or an element on the vehicle at each of a plurality of sample times during a time period. Transient velocity data can be used to determine a vehicle operating condition or conditions. Specifically, the vehicle or portion of the vehicle may have distinct or characteristic transient velocity profiles, in both the time and frequency domains, for each operating condition. Furthermore, the determination may incorporate other prior knowledge such as vehicle type, truck or car. The computer may predict, based on the vehicle operating condition(s), a future trajectory of the object vehicle, before this trajectory would otherwise be apparent. Based on the predicted future trajectory of the object vehicle, the computer may adjust a planned travel path for the host vehicle, e.g., to maintain a threshold distance between the host vehicle and the object vehicle. Determining object vehicle operating conditions based on measured object vehicle transient velocities allows for an earlier detection of changes in object vehicle trajectory and therefore an earlier adjustment of a host vehicle travel path to these changes. Furthermore, detection of operating conditions of other vehicles may allow remote indirect detection of road features, e.g. potholes, allowing the host vehicle to adjust a travel path to avoid the feature and provide a more comfortable riding experience for vehicle occupants.

Turning to FIG. 1, an example system 100 includes a host vehicle 105, a network 130 and a server 132.

The host vehicle 105 is a land vehicle such as a car, truck, motorcycle, etc., and includes a computer 110, sensors 112, actuators 114, vehicle components 116, and a human-machine interface (HMI) 118. The host vehicle 105 operates on a support surface such as a road 150. The road 150 includes one or more lanes 152 along which the host vehicle 105 and/or one or more object vehicles 160 may travel. A host vehicle environment is a volume above the ground and around the vehicle specified by a radius that can be determined, and that can vary, based on environmental conditions such as ambient light, precipitation, etc. The environment typically includes a terrain, objects, and ambient conditions, in which the host vehicle is operating. A planned route of the host vehicle herein means the streets, lanes, roads, etc., along which the host vehicle plans to travel for a trip, i.e., from an origin to a destination.

The computer 110 includes a processor and a memory such as are known. The memory includes one or more forms of computer-readable media, and stores instructions executable by the computer 110 for performing various operations, including as disclosed herein.

The computer 110 may operate the host vehicle 105 in an autonomous, a semi-autonomous mode, or a non-autonomous (or manual) mode. For purposes of this disclosure, an autonomous mode is defined as one in which each of host vehicle 105 propulsion, braking, and steering are controlled by the computer 110; in a semi-autonomous mode the computer 110 controls one or two of host vehicle 105 propulsion, braking, and steering; in a non-autonomous mode a human operator controls each of host vehicle 105 propulsion, braking, and steering.

The computer 110 may include programming to operate one or more of host vehicle 105 brakes, propulsion (e.g., control of acceleration in the host vehicle 105 by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle communications network, more than one processor, e.g., included in electronic control units (ECUs) or the like included in the host vehicle 105 for monitoring and/or controlling various vehicle components 116, e.g., a powertrain controller, a brake controller, a steering controller, etc. As used herein, the vehicle communications network is defined as one or more mechanisms for wired or wireless communications between the computer 110, sensors 112, actuators 114, vehicle components 116, a human-machine interface (HMI) 118, and any other electronic modules including an electronic control unit (ECU) of the host vehicle 105. The vehicle communications network can include, for example, one or more vehicle communications busses and one or more wireless communications networks. Non-limiting examples of vehicle communications busses include Controller Area Network (CAN) busses, Local Interconnect Network (LIN) busses, and Ethernet networks. Non-limiting examples of wireless communications networks include Bluetooth, Bluetooth Low Energy (BLE), and Wi-Fi Direct.

Via the vehicle communications network, the computer 110 may transmit messages to various systems and subsystems in the host vehicle 105 and/or receive messages from the various devices, e.g., sensors 112, actuators 114, vehicle components 116, a human-machine interface (HMI) 118, etc. Additionally, in cases where the computer 110 actually comprises a plurality of devices, the vehicle communications network may be used for communications between devices represented as the computer 110 in this disclosure. Further, as described below, various controllers and/or sensors 112 may provide data to the computer 110 via the vehicle communication network.

Vehicle sensors 112 may include a variety of devices such as are known to provide data to the computer 110. For example, the sensors 112 may include light detection and ranging (lidar) sensor(s) 112, etc., disposed on a top of the host vehicle 105, behind a host vehicle 105 front windshield, around the host vehicle 105, etc., that provide image data, location data, point-cloud data, depth map data etc., that can be used to determine relative locations, sizes, and shapes of objects surrounding the host vehicle 105. As another example, one or more radar sensors 112 fixed to host vehicle 105 bumpers may provide data to provide locations of the objects, object vehicles 160, etc., relative to the location of the host vehicle 105. The sensors 112 may further alternatively or additionally, for example, include camera sensor(s) 112, e.g. front view, side view, etc., providing images from an area surrounding the host vehicle 105. For example, the images may include images of object vehicles 160 which may be used to determine a type and/or model of the object vehicle 160 and determine the location of elements on the object vehicle 160. Vehicle element herein means a feature formed into a body of the object vehicle 160 such as a vehicle window frame or a component 116 included in the vehicle 160 such as a vehicle window.

The sensors 112 may further include temperature sensors, pressure sensors, rotation sensors, angle sensors, position sensors, torque sensors, etc. to detect vehicle operating states such as vehicle cabin temperature, vehicle engine temperature, vehicle speed, vehicle acceleration, vehicle turning angle, engine speed, brake pressure, etc.

Still further, the sensors 112 may include sensors for detecting transient velocity such as frequency modulated continuous wave (FMCW) lidar 112*f*, frequency modulated continuous wave (FMCW) radar 112*r*, and/or time-of-flight (TOF) cameras 112*t*. FMCW lidar 112*f* can be used to detect transient velocities of objects such as object vehicles 160. Further, imaging radar may be adaptable to detecting transient velocity data. Further, sensors may be paired to detect transient velocity data, e.g., two radars 112 with one sending and both detecting a return signal. Still further, an indirect mechanism may be applied for measuring transient velocity. For example, a stereo camera pair of event cameras 112 with high detection rates may be applied.

As noted above, transient velocity is a metric for characterizing relative movements of the vehicle or elements on the vehicle at the specific time of data collection compared to a reference coordinate system, such as the sensor position on the host vehicle. The vehicle body may move along one or any combination of (1) a first axis perpendicular to a surface supporting the vehicle (i.e., up and down), (2) a second axis through the vehicle from front to back and (3) a third axis perpendicular to the axis through the vehicle from front to back (i.e., from side to side). Further, the body or vehicle element may exhibit rotation around (4) the first axis (yaw), (5) the second axis (roll), and (6) the third axis (pitch). These six types of movement can be referred to as the six degrees of freedom (DoF). Movement along any of these six degrees of freedom may include a transient velocity component which may be indicative of a vehicle operating condition.

Based on the transient velocity, the FMCW lidar 112*f* can generate transient velocity data and provide the transient velocity data to the computer 110. Time-of-flight cameras 112*t* measure phase differences between components of transmitted light and reflected light from a target to determine a distance and/or a velocity of the target. In some cases the lidar 112*f* may be solid state allowing the ability to steer the lidar at specific locations to collect distance and transient velocity data over time. In other cases the lidar transmitters and receivers may be mounted onto a mechanical assembly which may rotate or transmit and receive light along an optical path incorporating a moving, translating or rotating mirror surface to scan the fixed lidar point throughout the road environment. In such cases the lidar points may not acquire transient velocity data at the same physical point in the space in each sweep. In such cases, numerical methods may be applied to the point cloud data of transient velocity measurements such as interpolation, e.g. linear, nearest neighbors, etc., or extrapolation via a vehicle dynamics model obtained from fitting a model to dynamics simulation data of one or both of the host and object vehicles 105, 160.

Based on the modelling of one or both of the host and object vehicles 105, 160 and numerical methods such as interpolation and extrapolation described above, the computer 110 may cancel out vibrations of the host vehicle 105 (including vibrations of the sensors 112 on the host vehicle 105) and estimate transient velocity behavior of the object vehicle 160. For example, a neural network for estimating transient velocity may be based on vehicle models such that input to the neural network includes data relating to specific fixed points in space relative to (typically on a surfaced of) a vehicle 160 body. Sensor 112 (e.g., FMCW lidar 112*f*) measurement targets on the object vehicle 160 may not exactly correspond to the fixed points in space on the vehicle body. Numerical methods to interpolate/extrapolate measurement locations on the object vehicle 160 to those fixed points to get the input to the neural network. The computer 110 may apply the numerical methods to the data collected from the sensors 112, and then submit the interpolated/extrapolated data to the neural network to receive an estimated transient velocity behavior of the object vehicle 160.

The computer 110 may collect transient velocity data of object vehicles 160 in the environment of the host vehicle 105 via the FMCW lidar 112*f* or time-of-flight cameras 112*t*. As described below, the computer 110 may determine an operating condition or operating conditions of the object vehicle 160 based on the transient velocity data.

The host vehicle 105 actuators 114 are implemented via circuits, chips, or other electronic and/or mechanical components that can actuate various vehicle subsystems in accordance with appropriate control signals as is known. The actuators 114 may be used to control vehicle components 116, including braking, acceleration, and steering of a host vehicle 105.

In the context of the present disclosure, a vehicle component 116 is one or more hardware elements, which may include an electronic control unit (ECU) including one or more processors and memory including instructions for programming the processors, adapted to perform a mechanical or electro-mechanical function or operation-such as moving the host vehicle 105, slowing or stopping the host vehicle 105, steering the host vehicle 105, etc. Non-limiting examples of vehicle components 116 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, an electronic stability control (ESC) module, a wiper control module, lighting, an entertainment system, etc. Vehicle components 116 may further include mechanical components of the host vehicle 105 such as bumpers, windows and windshields, mirrors, door handles, exhaust pipes, etc., which may be passive or active and may or may not include actuators 114, electronic control units (ECUs), etc.

The host vehicle 105 further includes a human-machine interface (HMI) 118. The human-machine interface (HMI) 118 includes input devices such as knobs, buttons, switches, pedals, levers, touch screens, microphones, etc. that can receive input from a user. For example, the HMI 118 may include a brake pedal, an accelerator pedal, and a steering wheel for receiving inputs from a user for controlling the host vehicle 105. The input devices may include sensors 112 to detect user inputs and provide user input data to the computer 110. For example, the steering wheel may include sensors 112 to detect an angle of rotation of the steering wheel and provide the data to the computer 110. The HMI 118 further includes output devices such as displays (including touch screen displays), speakers, lights, etc. that output signals or data to the user.

The HMI 118 is coupled to the vehicle communications network and can send and/or receive messages to and/or from the computer 110 and other vehicle sub-systems. As non-limiting examples, the HMI 118 may, based on user inputs, send messages over the vehicle communications network to control vehicle control systems, climate control systems, entertainment systems, lighting systems, communications systems, etc.

In addition, the computer 110 may be configured for communicating via a vehicle communications module with devices outside of the host vehicle 105, e.g., through a vehicle-to-vehicle (V2V) or vehicle-to-infrastructure (V2I) wireless communications to another vehicle 105 (typically via direct radio frequency communications) and/or (typically via the network 130) a server 132. The vehicle communications module can include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the vehicle communications module include cellular, Bluetooth, IEEE 802.11, IEEE 802.11p, IEEE 1609, dedicated short-range communications (DSRC), cellular V2V, 5G/LTE and/or wide area networks (WAN), including the Internet, providing data communication services.

The network 130 represents one or more mechanisms by which a computer 110 may communicate with the server 132. Accordingly, the network 130 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short-Range Communications (DSRC), 5G/LTE, etc.), local area networks (LAN) and/or wide area networks (WAN), including the Internet, providing data communication services.

The server 132 can be a conventional computing device, i.e., including one or more processors and one or more memories, programmed to provide operations such as disclosed herein. Further, the server 132 can be accessed via the network 130, e.g., the Internet or some other wide area network. The server 132 can provide data, such as map data, traffic data, weather data, etc. to the computer 110. Additionally, the server 132 may provide transient velocity signatures of different types and/or models of vehicles 105, 160 for different sets of operating conditions. A "type of vehicle" herein means a classification of category of vehicle having common physical measurements and components 116. A physical measurement is a measurement, expressed according to units of measure, of a physical phenomenon, e.g., distance, temperature, viscosity, etc., just to name a few examples. Physical measurements used herein include locations and dimensions of elements of the object vehicle 160 body and other vehicle elements.

For example, a sports utility vehicle (SUV) may be a type of vehicle. A vehicle model is the name used by a manufacturer to market a range of similar vehicles. For example, Mustang® is a model of vehicle manufactured by Ford Motor Company. The server 132 may additionally classify types and/or models of vehicles by a year of manufacture.

The road 150 can be any surface where the host vehicle 105 can travel, and along which or on which object vehicles 160 may be located. For example, the road 150 may be a suburban road or city street with marked or unmarked lanes 152. The road 150 may further be a limited access highway including lanes 152. The surface on which the host vehicle 105 and object vehicle 160 travel is also sometimes referred to as a road surface herein.

Object vehicles 160 may be land vehicles such as cars, trucks, motorcycles, construction vehicles, etc., and may include similar systems and subsystems as the host vehicle 105 described above but are assigned a separate reference numeral for purposes of distinguishing from a host vehicle 105 in the present description. The term "object vehicle" herein means a vehicle other than the host vehicle.

An object vehicle 160 may be moving. For example, the object vehicle 160 may be moving in a same lane 152 as the host vehicle 105 or moving in a lane 152 adjacent to the lane 152 in which the host vehicle 105 is operating. In some cases, the object vehicle 160 may be operating in a lane 152, but stopped, due, for example to a stop sign or red traffic signal.

An object vehicle 160 can be classified according to its one or more operating conditions. The object vehicles 160 display transient velocities that vary based on operating conditions. An operating condition herein means one or more physical measurements for a vehicle and/or the vehicle environment at a time when the measurement(s) was (were) taken. Operating conditions that may influence the transient velocity displayed by the object vehicle 160 include road conditions such as a type of road (support) surface (e.g., cement, dirt, gravel), a pothole, ice on the road surface, water on the road surface, etc.; weather conditions such as precipitation, wind, etc.; global vehicle operating conditions such as vehicle velocity, vehicle acceleration, etc.; and internal vehicle operating conditions such as engine speed, application of brakes (especially when it is sudden); failure of a component such as a component, etc.; and a driver mental state such as attentive, distracted, upset, etc.

In addition to variations based on operating conditions, transient velocities may vary depending on measurement targets on the object vehicle 160 where the transient velocities are measured. Measurement targets as used herein, are areas on the object vehicle 160 toward which sensors 112 for measuring transient velocity are directed to collect transient velocity data. Non-limiting examples of measurement targets include an area on the object vehicle 160 body such as near a front license plate, near a rear license plate, at a center point of the object vehicle hood, at a center of a rear door, etc.; and externally visible vehicle elements such a side-view mirror, a bumper, a center point on a vehicle door, a tail pipe, a muffler, a front grille, a hatch, a windshield, a rear window, a tail fin, a splitter, a canard, an air dam, a tire deflector, a diffuser, a brake cylinder, etc. For example, the transient velocity of a tail pipe of the object vehicle 160 may be different from the transient velocity of the body of the object vehicle 160 when the object vehicle 160 is running.

Measurement targets may be selected for characterizing different operating conditions of the object vehicle 160 based on transient velocities. For example, a measurement target may be selected based on proximity to a vibration source within the object vehicle 160. For example, a wheel may be selected as a measurement target to detect an application of brakes. Additionally, or alternatively, measurement targets may be selected based on empirical studies. For example, measurements may indicate that the transient velocity of an exhaust pipe correlates strongly with a speed of a running engine, or that the transient velocity of a driver's side door window exhibits a transient velocity that correlates with a driver yelling.

Figure 8:
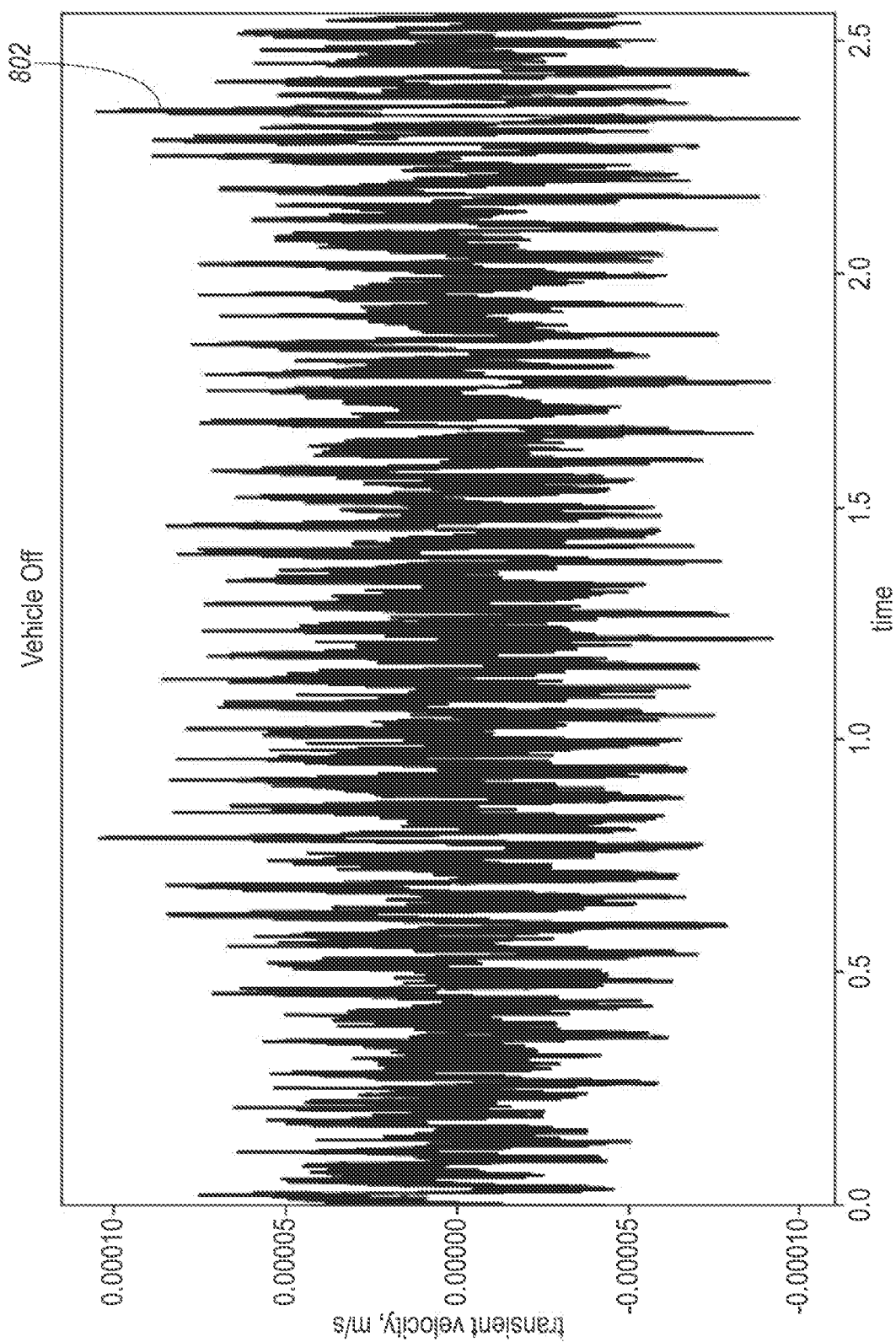
FIG. 8 is an example transient velocity signature for a vehicle with a turned-off engine.
Figure 9:
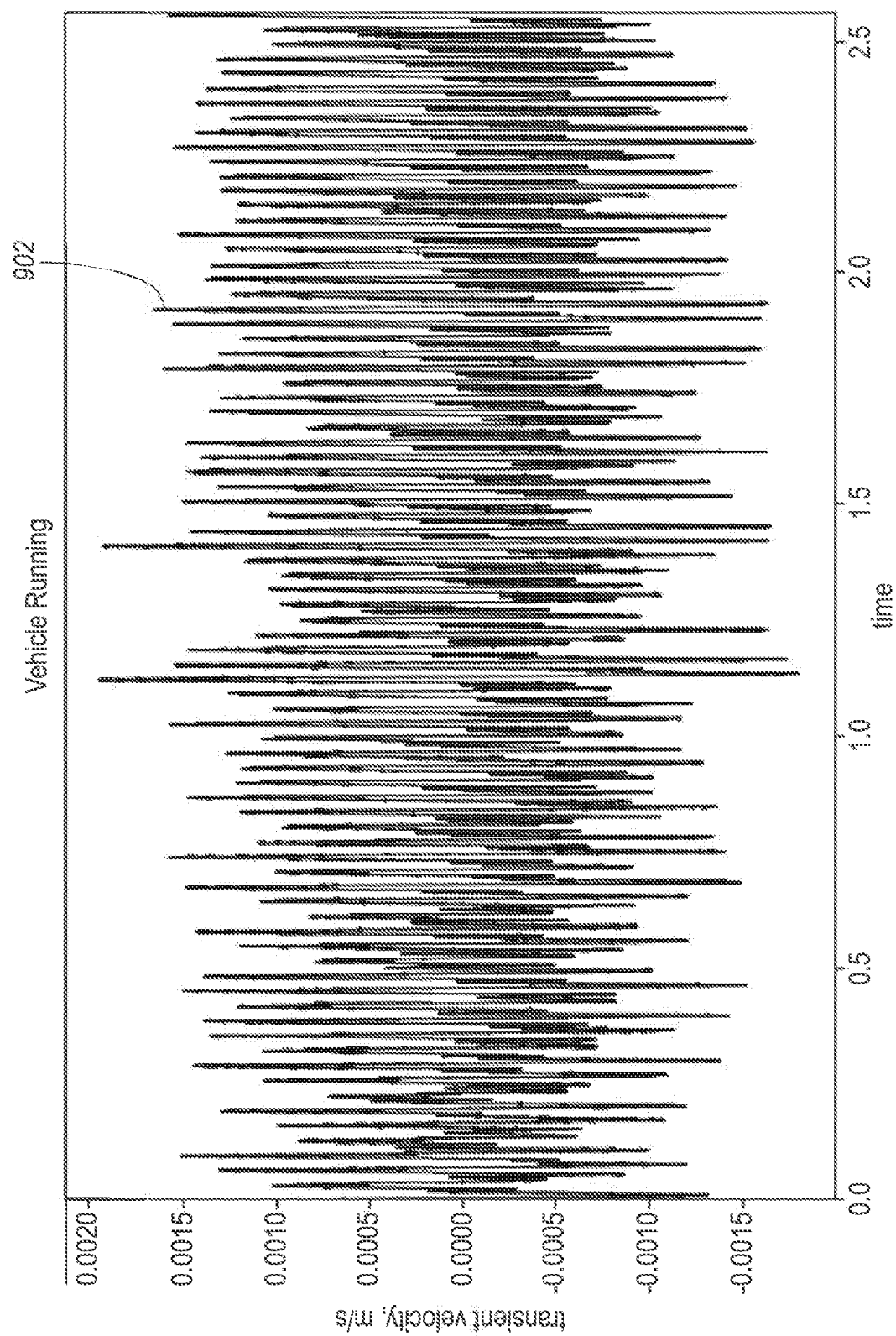
FIG. 9 is an example transient velocity signature for a vehicle with a running engine.

The transient velocities of different measurement targets of object vehicles 160 under different operating conditions can be measured and recorded, for example by a FMCW lidar 112*f*. A library of reference transient velocity profiles, referred to herein as transient velocity signatures, can be obtained empirically, i.e., under controlled (e.g., laboratory or test track) conditions, in which characteristic transient velocities of different object vehicle measurement targets are stored as samples, for example in the server 132. Each transient velocity signature is a set of data specifying respective transient velocities at a measurement point on a representative vehicle for respective sample times over a time period collected under known operating conditions. The transient velocity may be expressed in units of meters per second. The time period may be determined empirically as an amount of time over which a transient velocity signature representative of an operating condition or conditions may can be established. The time period may be, for example, 100 milliseconds. A representative vehicle is a vehicle used for collecting empirical data for establishing the library of transient velocity signatures. FIGS. 8 and 9 illustrate example transient velocity signatures.

The transient velocity signatures may be used to train a machine learning program such as the computer 110 in a machine learning mode. The machine learning program may receive further input such as the vector direction of the lidar measurement due to the fact the FMCW techniques measure relative radial transient velocities rather than velocities normal to the surface, other velocity vector components or other velocity vector components in some arbitrary direction. The velocity vector may be estimated based on multiple transient velocity measurements, interpolated temporally and/or spatially. For example, a host vehicle may be following an object vehicle. The transient velocity data, positions in space of the measurements on the vehicle, the radial velocity of the object vehicle, the velocity of the object vehicle, internal operating conditions such as engine speed, etc., may be used as inputs into the machine learning program. The radial velocity of object vehicle 160 in this context means the speed of the object vehicle relative to host vehicle along a line (radius) that connects the host vehicle 105 and the object vehicle 160. The velocity of the object vehicle is the speed and heading of the object vehicle relative to the support surface (e.g., a ground surface such as a roadway) on which it is travelling. Additionally, environmental conditions such as weather conditions, road conditions, etc. may be included as input data to train the computer 110. The transient velocity data may be passed to the computer 110 directly or after a pre-processing step such as a fast Fourier transformation (FFT).

The stored samples may be organized, for example, as a table that identifies transient velocity signatures (i.e., a record of transient velocities of a measurement target over time) associated with a target location and operating condition for a type of vehicle. Table 1, below, is an example of a portion of a table identifying transient data signatures with measurement targets and operating conditions for a vehicle type. Example transient velocity signatures are shown in FIGS. 8 and 9.

TABLE 1

Vehicle Type: SUV

| Measurement Target | Engine speed | Vehicle velocity | Road Condition | Transient Velocity Signatures |
|---|---|---|---|---|
| mid-left bumper | Engine on, 500 rpm | 10 mph | dry surface | signature 1 |
| mid-left bumper | Engine on, 500 rpm | 10 mph | wet surface | signature 2 |
| mid-left bumper | Engine on, 2000 rpm | 30 mph | dry surface | signature 3 |
| mid-left bumper | Engine on, 2000 rpm | 30 mph | wet surface | signature 4 |

For simplicity, Table 1 classifies transient velocity signatures according to three conditions; engine speed, vehicle velocity road condition. The transient velocity signatures could be based on any number of operating conditions, one or more.

Conditions in addition to an operating condition may affect the transient velocity data collected from the object vehicle 160. For example, movements of the sensors 112 on the host vehicle 105 used to collect the transient velocity data may be superimposed on, normalized, filtered, or subtracted from the transient velocity data collected from the object vehicle 160 to adjust the object vehicle transient velocity data to account for movements of host vehicle sensors 112.

The computer 110 can receive and analyze data from sensors 112 substantially continuously, periodically, and/or when instructed by a server 132, etc. Further, conventional classification or identification techniques can be used, e.g., in a computer 110 based on lidar sensor 112, FMCW LIDAR 112f, camera sensor 112, radar, time-of-flight (TOF) cameras 112t, etc., data to identify a type of object, e.g., vehicle, person, rock, pothole, bicycle, motorcycle, etc., as well as physical measurements of objects and operating conditions of objects.

The computer 110 can further be programmed to determine an operating condition of an object vehicle 160 based on collected transient velocity data. In some cases, a percentage likelihood may be associated with the determined operating condition. For example, upon measuring a transient velocity of an object vehicle 160, the computer 110 may determine that there is a 70% likelihood that a left front wheel of the object vehicle 160 has lost traction and the object vehicle 160 will swerve to the left. In an example, the computer 110 may then pass the transient velocity data through a fast Fourier transform (FFT) to convert the velocity history to the frequency domain and then input the frequency domain transient velocity data to a trained convolutional neural network (CNN). The convolutional neural network (CNN) can be trained to perform the operating condition processing by processing a plurality of transient velocity signatures at different locations on a vehicle for a known set of operating conditions. For example, the computer 110 may pass data from each measurement target through a separate channel of the FFT and input the frequency domain data from each of the measurement targets to the CNN. The known set of operating conditions is deemed ground truth for the plurality of transient velocity signatures. Ground truth in this context means data that is obtained by direct observation such as data gathered during empirical testing under controlled conditions. The ground truth may further be specific to a type of vehicle. The computer 110 can collect transient velocity data from the object vehicle 160 and input it to the convolutional neural network. The data may include the measurement target of the measurement and may further include the type of the object vehicle 160. The neural network, based on the transient velocity data from the object vehicle 160, may determine the operating condition for the object vehicle 160.

Figure 2:
FIG. 2 is a diagram of an example convolutional neural network.

FIG. 2 is a diagram of an example convolutional neural network (CNN) 200. The CNN 200 is a software program that can be implemented on a computing device such as the computer 110 that can be trained to input transient velocity data of an object vehicle 160 at an input 202 and output an operating condition or set of operating conditions in response at an output 204. The CNN 200 includes a plurality of convolutional layers that extract hidden features from the transient velocity data the object vehicle 160 which are passed to a plurality of fully-connected layers that transform the hidden features into the operating condition or set of operating conditions at the output 204. The CNN 200 can be trained to perform operating condition processing by processing a plurality of transient velocity data of vehicles to determine the operating condition or set of operating conditions for each transient velocity signature for a respective vehicle. The determined operating condition or set of operating conditions is defined as "ground truth", because it was determined independently from the CNN 200. The CNN 200 is trained by inputting the transient velocity data at the input 202 and backpropagating results to be compared with the ground truth to determine a loss function. Training the CNN 200 includes determining parameters for convolutional and fully-connected layers that minimize the loss function. When trained, a CNN 200 can input transient velocity data at the input 202 for an object vehicle 160 and output the operating condition or set of operating conditions at the output 204.

As another example, the computer 110 may input the transient velocity data to a recurrent neural network (RNN). A recurrent neural network (RNN) is a class of neural networks that is graph based and can exhibit temporal dynamic behavior. The RNN may be trained in a manner similarly to the training of the CNN described above. The trained RNN may determine, based on the transient velocity data, an operating condition or set of operating conditions for the object vehicle 160.

Figure 3:
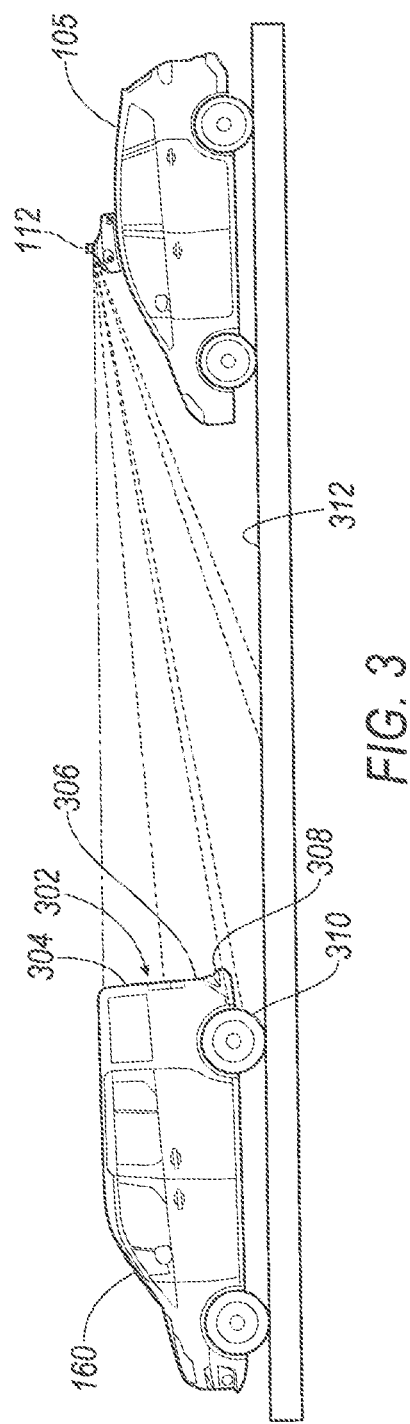
FIG. 3 is a diagram of an example host vehicle scanning an object vehicle in front of the host vehicle and scanning a support surface for the object vehicle and host vehicle.

FIG. 3 is a diagram of an example host vehicle 105 travelling behind an object vehicle 160 on a surface 312 supporting the host vehicle 105 and the object vehicle 160. In this configuration, Sensors 112 have a line-of-sight and can collect data from a back end 302 of the object vehicle 160 and elements such as a rear window 304, rear door 306, a bumper 308, a tire 310, etc. that are visible on the back end 302. The sensors 112 can further collect data from the surface 312 supporting the host vehicle 105 and the object vehicle 160.

Figure 4:
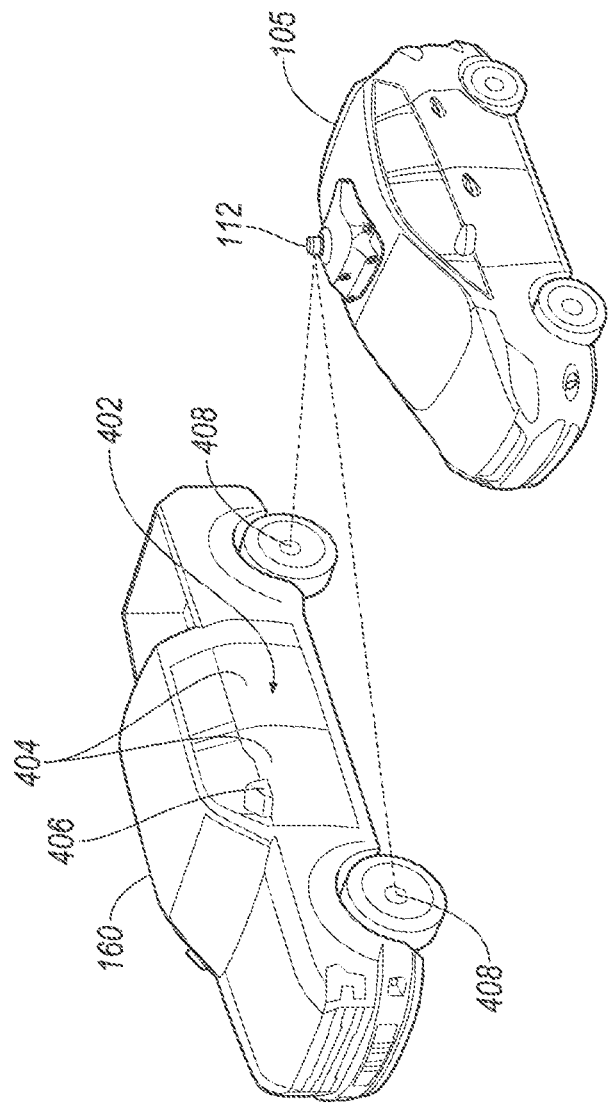
FIG. 4 is a diagram of an example host vehicle scanning an object vehicle beside the host vehicle.

FIG. 4 is a diagram of an example host vehicle 105 and an example object vehicle 160 wherein the host vehicle 105 is beside the object vehicle 160 such that sensors 112 on the host vehicle 105 have a line-of-sight to elements on a side 402 of the object vehicle 160 such as doors 404, side-view mirror 406, wheels 408, etc. Such line-of-sight sensing may occur, for example, when the host vehicle 105 and object vehicle 160 are travelling along different lanes of a road 106 and the object vehicle 160 is within range of sensors 112 on the host vehicle 105.

Figure 5:
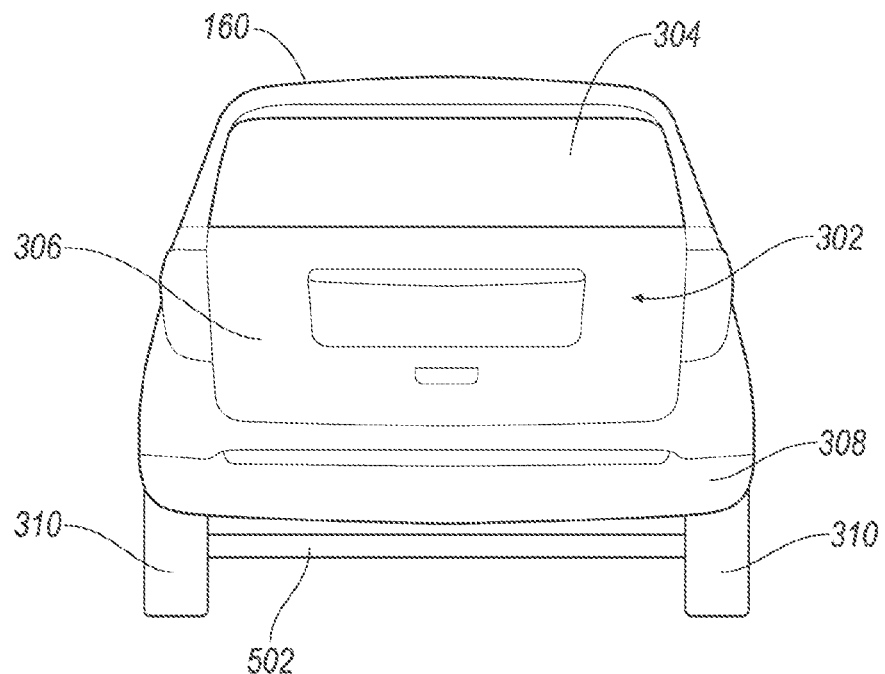
FIG. 5 illustrates example measurement targets on a rear end of an object vehicle.

FIG. 5 illustrates an example back end 302 of an object vehicle 160. A non-limiting list of vehicle elements that may be visible from the back end 302 of the object vehicle 160 include the rear door 306, the bumper 308, the tires 310, and a rear axle 502.

Figure 6:
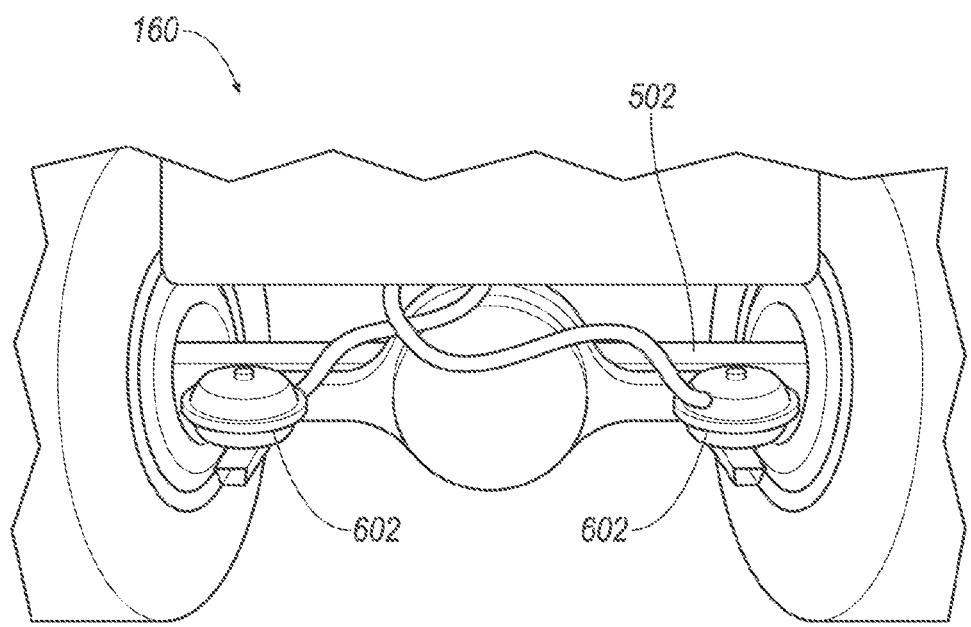
FIG. 6 illustrates example measurement targets on components of an object vehicle.

FIG. 6 illustrates an example of a portion of a back end of an object vehicle 160 illustrating the rear axle 502 and brake elements 602. Transient velocity measurements of the brake elements 602 may provide, for example, additional information regarding the operation of vehicle brakes, beyond the transient velocity measurements of other vehicle elements.

Figure 7A:
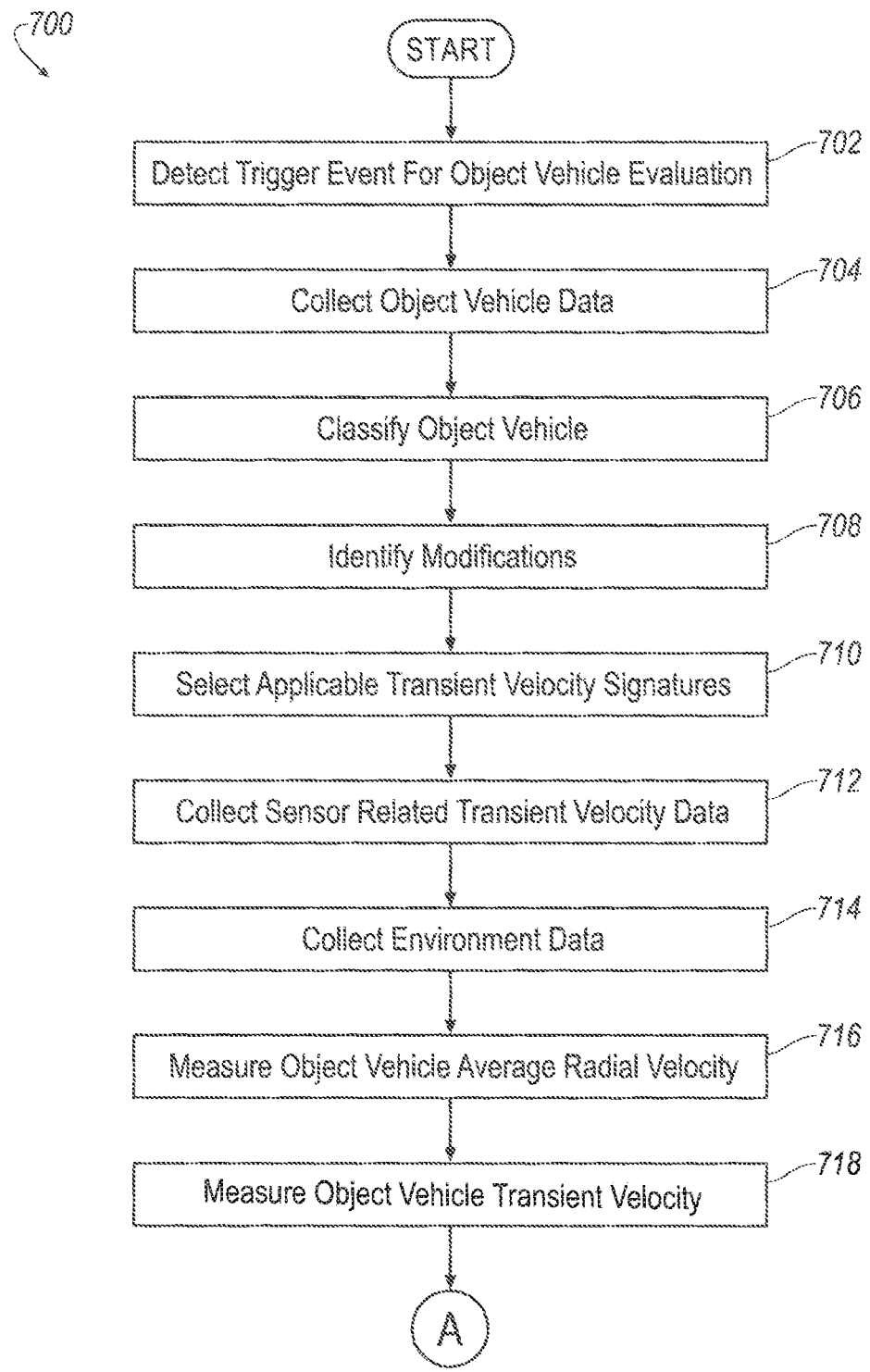
FIGS. 7A and 7B are a diagram of an example process for determining an operating condition of an object vehicle based on transient velocity measurements and adjusting a host vehicle trajectory.
Figure 7B:
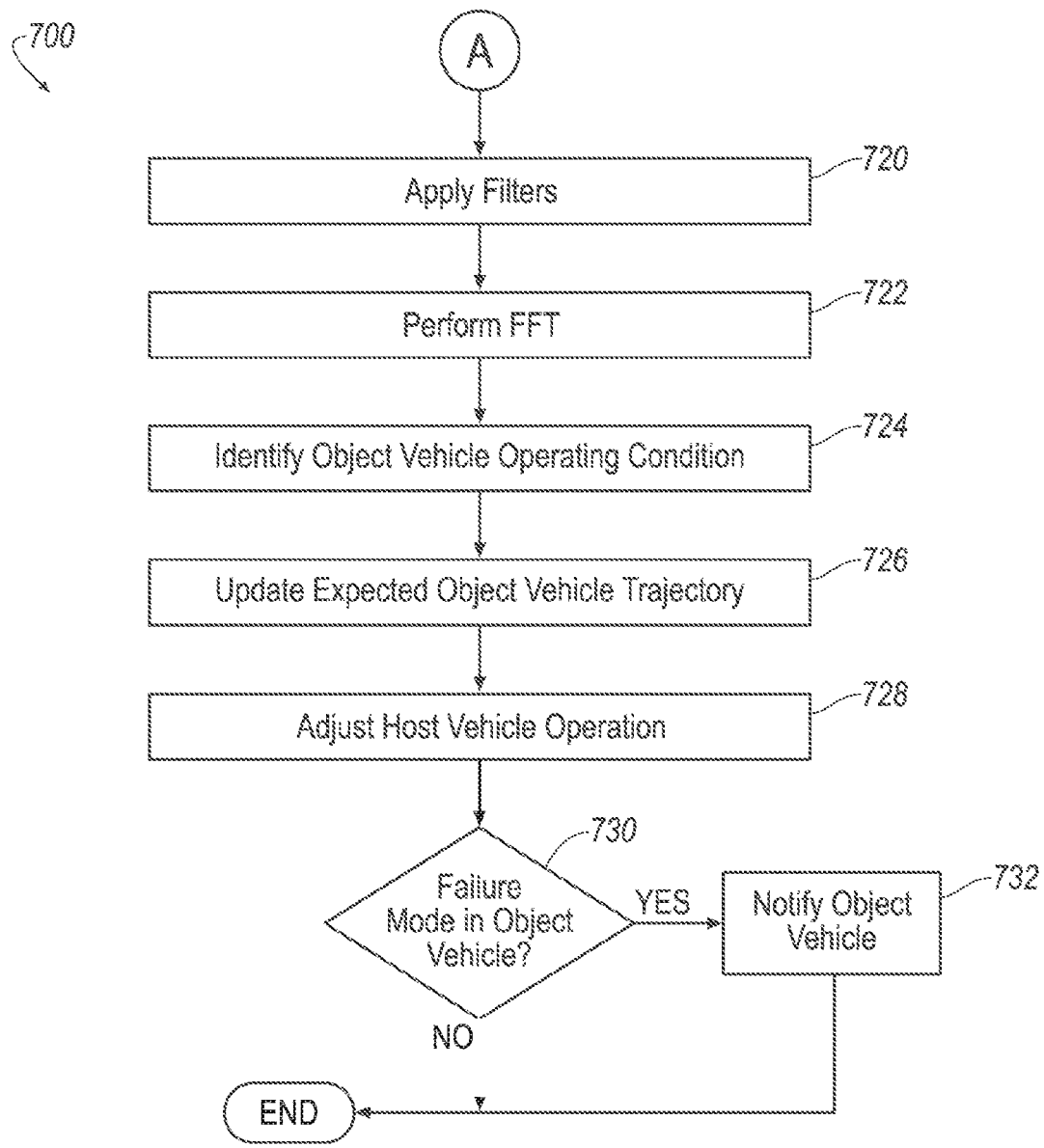

FIGS. 7A and 7B are a diagram of an example process 700 for classifying an object vehicle 160 according to a determined operating condition or set of operating conditions based on transient velocities measured on the object vehicle 160.

As an overview of the process 700, computer 110 on a host vehicle 105 collects, via sensors 112 on the host vehicle 105, transient velocity data from an object vehicle 160 proximate to the host vehicle 105. Proximate to the host vehicle 105 in this context means within range to be measured by sensors 112 on the host vehicle 105 including sensors 112 for measuring transient velocity such as FMCW lidar 112f or a time-of-flight (TOF) camera 112t. In some cases, the computer 110 of the host vehicle 105. Based on the collected transient velocity data, the computer 110 on the host vehicle 105 assigns an operating condition or set of operating conditions to the object vehicle 160. Based on the assigned operating condition or set of operating conditions, the computer 110 further predicts, or updates a prediction of the future trajectory of the object vehicle 160. Based on the predicted future trajectory of the object vehicle 160, the computer 110 may further revise the route or a travel path along the route of the host vehicle 105 to reduce the likelihood that the trajectory of the object vehicle 160 will interfere with the trajectory of the host vehicle 105. A travel path, as used herein, is a line and/or curve (defined by points specified by coordinates such as geo-coordinates) steered by the host vehicle along the planned route.

The process 700 begins in a block 702. In the block 702, the computer 110 detects a trigger event for starting an object vehicle evaluation. A trigger event is data or a datum above and/or below a specified threshold. For example, the trigger event may be detecting an object vehicle 160 within a within a threshold distance of a planned travel path of the host vehicle 105. Additionally or alternatively, the trigger event may be detecting an object vehicle within a threshold distance of the host vehicle 105. The computer 110, for example, may have generated the planned route based on user input indicating a planned destination for the host vehicle 105 or may have received the planned route directly through user input. Based on data collected from sensors 112, the computer 110 may determine that an object vehicle 160 is present in or along the planned route for the host vehicle 105. The computer 110 may further determine, based on the collected data, whether the object vehicle 160 is stationary or moving. The trigger event may additionally or alternatively depend on other conditions such as the object vehicle 160 moving at a time of detection, the host vehicle 105 moving at the time of detecting the object vehicle 160, the object vehicle 160 being within a predetermined distance of the host vehicle 105, the object vehicle 160 being within a distance that the host vehicle will travel within a predetermined amount of time, etc. (e.g., within 30 seconds, based on a planned travel path for the host vehicle 105 along the planned route), etc. Upon detecting the trigger event for starting the object vehicle evaluation, the process 700 continues in a block 704.

In the block 704 the computer 110 collects data from the object vehicle 160. The computer 110, using sensors 112 such as lidar, radar, cameras, etc., collects data, including depth and point-cloud data, regarding physical measurements of the host vehicle 105 and operating conditions of the host vehicle 105. Depth and point-cloud data are data, collected for example from radar, lidar and cameras, of multiple points on a surface, from which a three-dimensional structure of the object can be determined. A non-limiting list of physical measurements for which the computer 110 may collect data include object vehicle 160 location, shape, and size, the location, shape, and size of elements on the vehicle 160 such as bumpers 308, tires 310, windows such as a rear window 304, doors such as a doors 404, mirrors such as side-view mirrors 406, wheels 408, mirrors, axles such as the rear axle 502, braking elements 602, etc.

The computer 110 may further collect data related to global operating conditions of the object vehicle 160 such as velocity (speed and heading) relative to ground, radial velocity (speed and heading) relative to the host vehicle 105, geo-location (longitude and latitude), acceleration, etc. The process 700 continues in a block 706.

In the block 706, the computer 110 identifies physical measurements of the object vehicle 160, and based on the physical measurements, classifies the object vehicle 160. Classifying the object vehicle 160 means in this context to determine a type and/or model of the object vehicle and may include determining modifications of the object vehicle 160 relative to the type or model. The computer 110 applies image recognition algorithms as are known to determine, for example, a make and model of object vehicle 160 and/or whether the object vehicle 160 is, for example, a sports utility vehicle (SUV), a pick-up truck, a sedan, a van, etc. For example, the computer 110 may determine that the object vehicle 160 is a 2019 Ford Mustang.

Based on classification of the object vehicle 160, the computer 110 may further determine components 116 of the object vehicle 160. For example, the computer 110 may retrieve, from the server 132, data indicating expected components 116 in the identified class of the object vehicle 160. The process 700 continues in a block 708.

In the block 708, the computer 110, based on the collected data and stored data for vehicle types and/or vehicle models, identifies modifications to the object vehicle 160 relative to the type or model of the object vehicle 160. For example, based on the model of the object vehicle 160 determined in the block 706, the computer 110 may retrieve, for example from the server 132, data indicating expected physical measurements and/or components 116 of the type or model. The computer 110 may then compare the collected data of the object vehicle 160 with the data indicating expected physical measurements and/or components 116 of the type or model. Based on the comparison, the computer 110 may determine whether modifications have been made to the object vehicle 160. For example, in the case the object vehicle 160 was determined that to be a 2019 Ford Mustang, the computer 110 may compare the collected data for the object vehicle 160 with expected data for a 2019 Ford Mustang and determine that the object vehicle 160 was modified to include wider tires. As described below, modifications to object vehicles 160 may be relevant to interpreting transient velocity data. Upon identifying modifications to the physical measurements and/or components 116 of the object vehicle 160, the process 700 continues in a block 710.

In the block 710, the computer 110 selects applicable transient velocity signatures for evaluating the object vehicle 160. For example, the computer 110 may store in memory, or access in a remote computer such as the server 132, a library of transient velocity signatures. For example, the library may be maintained in a relational database. The transient velocity signatures may be organized according to one or more parameters including: the type of the object vehicle 160; model of the object vehicle 160; common modifications of the object vehicle 160 model such as type of wheels, type of engine, type of brakes, etc.; known operating conditions such as object vehicle 160 velocity; known environmental conditions such as type of road; and known weather conditions such as type and amount of precipitation. Some parameters, such as a type or model, may be mandatory for selecting a transient velocity signature. Other parameters, for example, common modifications of the object vehicle 160, or transient velocity signatures based on weather conditions, may be used when transient velocity signatures for such data have been collected. In cases that transient velocity signatures are not available for the specific modification or specific condition, the selection may default to a more general transient velocity signature for the type or model of the object vehicle 160. In other cases, when a modification or weather condition (for example, a hurricane, or a severely damaged object vehicle 160) is known to have a significant impact on transient velocity measurements, the computer 110 may end efforts to determine an operating condition based on transient velocity data.

The transient velocity signatures may further be organized according to measurement targets at which the underlying transient velocity data was collected. As described above, different measurement targets may be selected for characterizing different operating conditions of the object vehicle 160 based on transient velocities. In some cases, measurement targets may be elements on the object vehicle 160.

Each transient velocity signature may be an expected transient velocity at a measurement target, or an expected set of transient velocities at a set of measurement targets on an object vehicle 160 of a known type or model for an operating condition or set of operating conditions. The expected transient velocities may be based on empirical data collected from vehicles of a same type or model, for example on a test track under the operating condition or set of operating conditions.

The transient velocity signatures may further be categorized based on known modifications to the object vehicle 160 relative to the object vehicle type or model. For example, a type of vehicle may have a first transient velocity signature for standard (as purchased at a dealer) tires and a second transient velocity signature for extra wide tires.

The transient velocity signatures may further be categorized based on known operating conditions such as object vehicle speed, a type of road (support) surface on which the object vehicle is travelling, weather conditions, etc.

Upon selecting one or more applicable transient velocity signatures for evaluating the object vehicle 160, the process 700 continues in a block 712.

In the block 712, the computer 110 collects sensor 112 related transient velocity data. Sensor 112 related transient velocity data, in this context means transient velocity data due to movement of the sensor 112 relative to a support surface 312 that may be superimposed on transient velocity measurements of the object vehicle 160 by the sensor 112. For example, the host vehicle 105 body may move, for example oscillate, relative to the support surface 312, in particular when the host vehicle 105 is moving. Further, the sensor 112 may move relative to the body of the host vehicle 105 on which it is mounted. In the block 712, the computer 110 collects sensor 112 related transient velocity data by measuring the transient velocity of the support surface 312 via the sensor 112 and inferring that the measured transient velocity is due to movement of the sensor 112 relative to the support surface 312. Upon measuring the sensor 112 related transient velocity data, the process 700 continues in a block 714.

In the block 714, the computer 110 collects data related to the environment of the host vehicle 105 and object vehicle 160. The computer 110 may, for example, collect map data from the server 132 indicating a type of road (support) surface 312 on which the vehicles 105, 160 are travelling. The computer 110 may further collect weather data from the server 132 indicating, for example, a presence and type of precipitation in the environment, an amount and direction of wind, etc. Further, the computer 110 may collect data related to the environment from sensors 112. For example, the computer 110 may collect data indicating that rain is falling or that there is snow on the surface 312 supporting the host vehicle 105 and object vehicle 160. The process 700 continues in a block 716.

In the block 716, the computer 110 measures an average radial velocity of the object vehicle 160 relative to the host vehicle 105. The average radial velocity may be measured for a measurement period and may be expressed as an average speed and an average direction. The measurement period may be an amount of time such as one second. The computer 110, via sensors 112 such as lidar 112 and radar 112, may measure the relative radial velocity of the object vehicle 160 at two or more times during the measurement period, and calculate an average radial velocity for the measurement period based on the measurements.

Next, in a block 718, the computer 110 collects transient velocity data from the object vehicle 160. Based on a position of the host vehicle 105 and the object vehicle 160, the computer 110 may select one or more measurement targets on the object vehicle 160. For example, in the case that the object vehicle 160 is travelling in front of the host vehicle 105, the computer 110 may select one or more measurement targets on a back end 302 of the object vehicle 160. In the case that the object vehicle 160 is travelling in a different lane, for example, besides, the host vehicle 105, the computer 110 may select measurement targets on a side 402 of the object vehicle 160. In a similar manner, in a case that the object vehicle 160 is approaching the host vehicle 105, the computer 110 may select measurement targets on a front end of the object vehicle 160.

The computer 110 may direct sensors 112 such as FMCW lidar 112*f* or a time-of-flight (TOF) camera 112*t* to collect transient velocity data from the identified measurement targets. The computer 110 then collects transient velocity data for one or more first predetermined time periods. The one or more first predetermined time periods may be separated by one or more second predetermined time periods. Upon collecting the object vehicle 160 transient velocity data, the process 700 continues in a block 720.

In the block 720, the computer 110 applies filters to reduce or remove superimposed signals on the transient velocity data from the object vehicle 160 due to the sensor 112 related transient velocity and the relative radial velocity of the object vehicle 160 relative to the host vehicle 105.

In an example, the transient velocity of a measurement target on the object vehicle 160 may be given by equation 1 below:

$$TV_{ov} = TV_{ovm} - RV_{ovave} - TV_{sensor} \quad \text{Eq. 1}$$

where:
$TV_{ov}$ is the transient velocity of the object vehicle after correction (filtering),
$TV_{ovm}$ is the measured transient velocity of the object vehicle,
$RV_{ovave}$ is the average radial velocity of the object vehicle 160 relative to the host vehicle 105, and
$TV_{sensor}$ is the sensor 112 related transient velocity.

That is, the computer 110 may subtract the sensor 112 related transient velocity $TV_{sensor}$ and the average radial velocity of the object vehicle 160 relative to the host vehicle 105 $RV_{ovave}$ from the measured object vehicle 160 transient velocity $TV_{ovm}$ to obtain the transient velocity of the object vehicle after correction $TV_{ov}$. When transient velocity measurements were performed at multiple measurement targets, this calculation may be made for each of the measurement targets.

Other approaches may also be applied for correcting the measured transient velocity of the object vehicle 160 $TV_{ovm}$. For example, the computer 110 may identify a range of frequencies in the sensor related transient velocity $TV_{sensor}$ and/or the average radial velocity $RV_{ovave}$. The computer 110 may then filter the measured object vehicle 160 transient velocity $TV_{ovm}$ to remove or reduce signals in the range of frequencies identified in the sensor 112 related transient velocity $TV_{sensor}$ and/or average radial velocity $RV_{ovave}$ from the measured object vehicle 160 transient velocity $TV_{ovm}$ to obtain the transient velocity of the object vehicle after correction $TV_{ov}$.

The examples are not intended to be limiting. Other approaches may be used to correct the measured object vehicle 160 transient velocity $TV_{ovm}$ based on the sensor 112 related transient velocity data $TV_{sensor}$ and/or the average radial velocity $RV_{ovave}$. For example, a recurrent neural network (RNN) or other graph-based neural network may be trained to receive the measured object vehicle 160 transient velocity $TV_{ovm}$, the sensor 112 related transient velocity $TV_{sensor}$, and the relative radial velocity $RV_{ovave}$, and output the corrected object vehicle 160 transient velocity $TV_{ov}$. Upon correcting the measured object vehicle 160 transient velocity $TV_{ovm}$ for the average radial transient velocity $RV_{ovave}$ and/or the sensor 112 related transient velocity $TV_{sensor}$, The process 700 continues in a block 722.

In the block 722, the computer 110 performs a fast Fourier Transform on the object vehicle 160 transient velocity $TV_{ov}$ after corrections as described above. The process 700 continues in a block 724.

In the block 724, the computer 110 identifies an operating condition of the object vehicle 160 based on the object vehicle 160 transient velocity data $TV_{ov}$. As described above, the computer 110 may input the transient velocity $TV_{ov}$ to a machine learning program, e.g., a neural network such as the convolutional neural network (CNN) 200. In addition to inputting the object vehicle 160 transient velocity data $TV_{ov}$, the computer 110 may input other conditions that may impact the operating condition such as object vehicle velocity, road conditions, and/or weather conditions. Based on the inputs, the convolutional neural network (CNN) 200 generates an output 204 indicating an operating condition for the object vehicle 160. The process 700 continues in a block 726.

In the block 726, the computer 110 determines or updates a predicted trajectory of the object vehicle 160 based on the determined operating condition. The computer 110 may maintain a table which maps determined operating conditions to predicted trajectories of the object vehicle 160. The table may be generated based on empirical data. Table 2, below, is an example of portion of a table mapping determined operating conditions.

TABLE 2

Predicting Vehicle Trajectory based on Operating Condition

| Operating Condition | Predicted Trajectory |
| --- | --- |
| Engine speed increased | Vehicle velocity increases |
| Driver yelling | Vehicle heading erratic |
| Brakes applied | Vehicle velocity decreases |
| Wheel loses traction | Vehicle swerves |

For example, prior to measuring and evaluating the object vehicle 160 transient velocity data, the computer 110 may have determined an expected object vehicle 160 trajectory. Based on the transient velocity data, the computer 110 may have determined that the operating condition for the object vehicle 160 is "lost traction." The computer 110 may then update the expected trajectory of the object vehicle 160 to include, for example, a percentage likelihood that the object vehicle 160 will swerve. Upon determining or updating the expected trajectory of the object vehicle 160, the process 700 continues in a block 728.

In the block 728 the computer 110, based on the updated predicted trajectory of the object vehicle 160 may adjust a travel path for the host vehicle 105. The computer 110 may, for example, provide the updated predicted trajectory of the object vehicle 160 to path planning algorithms for autonomous control of the host vehicle 105. Path planning algorithms exist that, considering the route of the host vehicle 105, other objects along the travel path of the host vehicle 105, etc., can adjust the planned travel path based on the updated predicted trajectory.

The path planning algorithms may, for example, apply cost reduction algorithms, that adjust the travel path to reduce a probability of the host vehicle 105 coming within a threshold distance of the object vehicle 160, or minimizing a total probability of the host vehicle 105 coming within the threshold distance of any object vehicles 160.

In other cases, the path planning algorithms may apply tables that map operating conditions of the object vehicle 160 to travel path adjustments. For example, in a case that the computer 110 determines that the likelihood of the object vehicle 160 will swerve increased from 0.5% to 30%, the computer 110 may adjust the travel path of the host vehicle 105 travelling behind the object vehicle 160 to slow down or move to a lane 152 farther from object vehicle 160. In other cases, where a probability of the object vehicle 160 continuing a same trajectory stays the same or increases, the computer 110 may leave the travel path and speed of the host vehicle 105 unchanged. The process 700 continues in a block 730.

In the block 730, the computer 110 determines, based on the operating condition of the object vehicle 160 as identified in the block 720, whether a failure mode is present in the object vehicle 160. For example, the computer 110 may determine that a component is not working properly or that a brake for one of the wheels 408 is not working properly. In a case that the computer 110 identifies a failure mode in the object vehicle 160, the process 700 continues in a block 732. Otherwise, the process 700 ends.

In the block 732, the computer 110 may report the failure mode to the object vehicle 160 and/or the server 132. Upon reporting the failure mode, the process 700 ends.

Measurements were performed on a vehicle to illustrate example transient velocity signatures. The measurements were performed by a laser Doppler vibrometer directed at a bumper of a vehicle and indicate transient velocity signature data that can be measured. FIG. 8 illustrates an example transient velocity signature 802 measured on a bumper of the vehicle with the engine off. FIG. 9 illustrates an example transient velocity signature 902 on the bumper of the vehicle with the engine on.

Figure 10A:
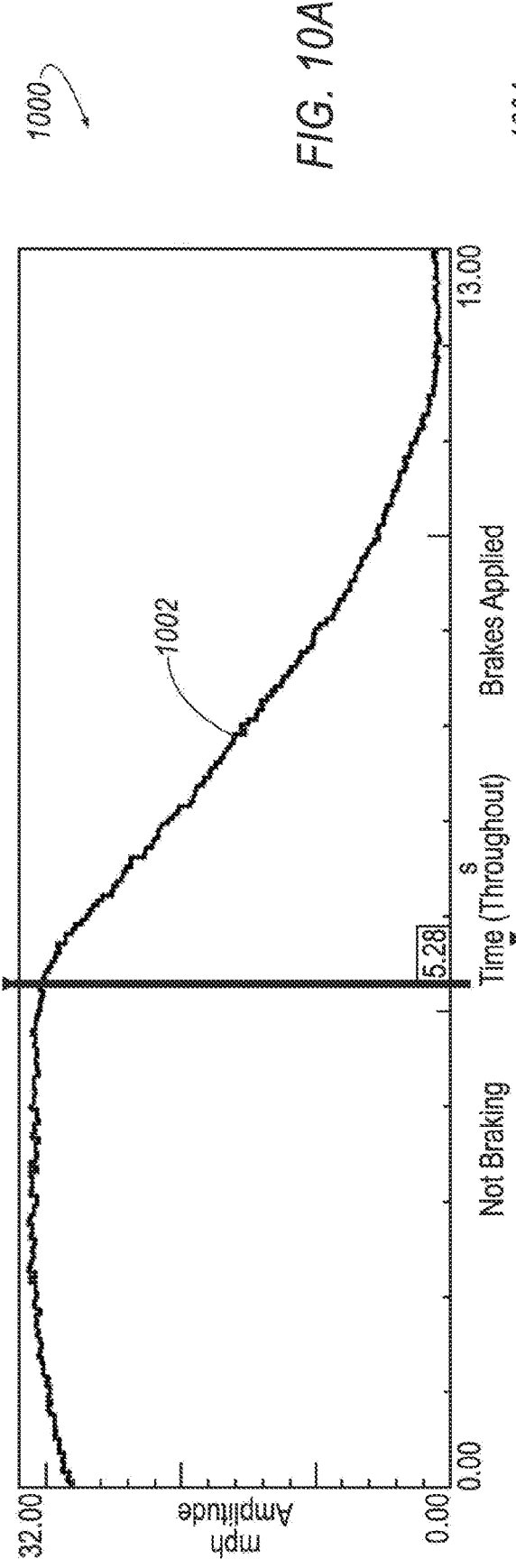
FIG. 10A is a graph of example vehicle speed over time prior to and during a braking event.
Figure 10B:
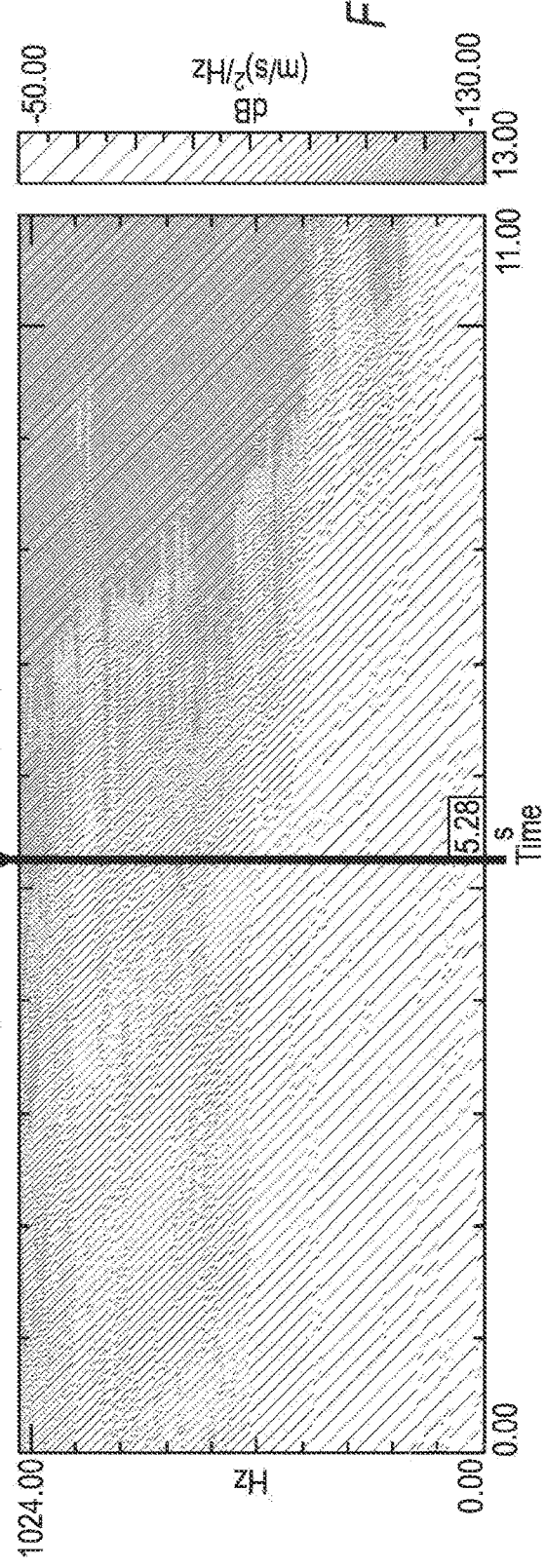
FIG. 10B is a graph of example accelerometer data, integrated to velocity, of a vehicle radial velocity during the braking event of FIG. 10A.

FIGS. 10A and 10B illustrate an example measurement of a vehicle transient velocity during a braking event. Brakes on the vehicle were activated when the vehicle was travelling at a speed of approximately 30 miles per hour. Radial velocity measurements of the vehicle on the wheel housing, after fast Fourier transform conversion into the frequency domain demonstrate that at specific vibration frequencies the radial velocity may be used to detect a change in the vehicle's state (e.g., braking) based on a transient velocity component of a vehicle velocity taken from external measurements.

FIG. 10A is an example graph 1000 including a curve 1002 of vehicle speed over time prior to and during a braking event.

FIG. 10B is an example graph 1004 of accelerometer data, integrated to velocity, that show amplitude and frequency content of the radial velocity decaying proportionally to the vehicle speed in a lateral direction.

As used herein, the term "based on" means based on in whole or in part.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Intercal, Simulink, Stateflow, Visual Basic, Java Script, Perl, HTML, Python, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. CD-ROM and DVD are examples of write once/read many (WORM) devices.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
   identify, based on data from first sensors included in a first vehicle, a second vehicle moving within a first threshold distance of a travel path of the first vehicle and within a second threshold distance of the first vehicle;
   select a measurement target that is the second vehicle or an element on the second vehicle;
   collect, from second sensors included in the first vehicle, transient velocity data from the measurement target, wherein the transient velocity data describes a velocity of the measurement target at a frequency of oscillation of the measurement target with respect to the second sensors; and
   determine an operating condition of the second vehicle based on the transient velocity data.

2. The system of claim 1, wherein the processor is further programmed to:
   determine, based on the data from the first sensors, an average radial velocity of the second vehicle relative to the first vehicle, wherein determining the operating condition of the second vehicle is further based on the average radial velocity of the second vehicle relative to the first vehicle.

3. The system of claim 1, wherein the processor is further programmed to:
   determine, based on data from the first sensors; physical dimensions of the second vehicle, wherein determining the operating condition of the second vehicle is further based on the physical dimensions of the second vehicle.

4. The system of claim 1, wherein the processor is further programmed to:
   determine a velocity of the second vehicle relative to a support surface, wherein determining the operating condition of the second vehicle is further based on the velocity of the second vehicle relative to the support surface.

5. The system of claim 1, wherein the processor is further programmed to:
   determine a type of support surface on which the second vehicle is travelling, wherein determining the operating condition of the second vehicle is further based on the type of the support surface.

6. The system of claim 1, wherein the processor is further programmed to:
   predict a trajectory of the second vehicle based on the determined operating condition of the second vehicle.

7. The system of claim 6, wherein the processor is further programmed to: adjust a travel path of the first vehicle based on the predicted trajectory of the second vehicle.

8. The system of claim 1, wherein the processor is further programmed to: receive from the second sensors, transient velocity data from a surface supporting the first vehicle; and
   determine the operating condition in part based on the transient velocity data from the surface supporting the first vehicle.

9. The system of claim 8, wherein the processor is further programmed to filter the transient velocity data from the measurement target based on the transient velocity data from the surface supporting the first vehicle.

10. The system of claim 9, wherein the processor is further programmed to:
    input the filtered transient velocity data to a trained neural network which determines the operating condition; and
    receive the operating condition of the second vehicle from the trained neural network.

11. The system of claim 10, wherein the trained neural network is trained using a plurality of transient velocity data, each of the plurality of transient velocity data representative of a moving vehicle in a respective controlled operating condition and further wherein each of the respective controlled operating conditions correspond to respective ground truths for purposes of training the trained neural network.

12. The system of claim 1, wherein the processor is further programmed to:
    notify the second vehicle in a case that the transient velocity data indicates a failure mode in the second vehicle.

13. A method comprising:
    identifying, based on data from first sensors included in a first vehicle, a second vehicle moving within a first threshold distance of a travel path of the first vehicle and within a second threshold distance of the first vehicle;
    selecting a measurement target that is the second vehicle or an element on the second vehicle;
    collecting, from second sensors included in the first vehicle, transient velocity data from the measurement target, wherein the transient velocity data describes a velocity of the measurement target at a frequency of oscillation of the measurement target with respect to the second sensors; and
    determining an operating condition of the second vehicle based on the transient velocity data.

14. The method of claim 13, further comprising:
    determining, based on the data from the first sensors, an average radial velocity of the second vehicle relative to the first vehicle, wherein determining the operating condition of the second vehicle is further based on the average radial velocity of the second vehicle relative to the first vehicle.

15. The method of claim 13, further comprising:
    determining, based on data from the first sensors; dimensions of the second vehicle, wherein determining the operating condition of the second vehicle is further based on the physical dimensions of the second vehicle.

16. The method of claim 13, further comprising:
determining a velocity of the second vehicle relative to a support surface, wherein determining the operating condition of the second vehicle is further based on the velocity of the second vehicle relative to the support surface.

17. The method of claim 13, further comprising:
predicting a trajectory of the second vehicle based on the determined operating condition of the second vehicle, and
adjusting a travel path of the first vehicle based on the predicted trajectory of the second vehicle.

18. The method of claim 13, further comprising:
receiving from the second sensors, transient velocity data from a surface supporting the first vehicle; and
determining the operating condition in part based on the transient velocity data from the surface supporting the first vehicle.

19. The method of claim 13, further comprising:
inputting the transient velocity data from the second vehicle to a trained neural network which determines the operating condition; and
receiving the operating condition of the second vehicle from the trained neural network, wherein the trained neural network is trained using a plurality of transient velocity data, each of the plurality of transient velocity data representative of a moving vehicle in a respective controlled operating condition and further wherein each of the respective controlled operating conditions correspond to respective ground truths for purposes of training the trained neural network.

20. The method of claim 13, further comprising:
notifying the second vehicle in a case that the transient velocity data indicates a failure mode in the second vehicle.

* * * * *